United States Patent
Mellema et al.

(10) Patent No.: US 10,242,578 B2
(45) Date of Patent: Mar. 26, 2019

(54) FLIGHT PATH MANAGEMENT SYSTEM

(71) Applicant: GE Aviation Systems LLC, Grand Rapids, MI (US)

(72) Inventors: Peter Mellema, Kentwood, MI (US); Scott Robert Edwards, Grandville, MI (US); Kathy Jo Smith, Caledonia, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/225,046

(22) Filed: Aug. 1, 2016

(65) Prior Publication Data

US 2018/0033313 A1 Feb. 1, 2018

(51) Int. Cl.
*G08G 5/00* (2006.01)
*B64C 39/02* (2006.01)
*G05D 1/02* (2006.01)

(52) U.S. Cl.
CPC ......... *G08G 5/0034* (2013.01); *B64C 39/024* (2013.01); *G05D 1/0202* (2013.01); *G08G 5/006* (2013.01); *G08G 5/0021* (2013.01); *G08G 5/0052* (2013.01); *B64C 2201/126* (2013.01); *B64C 2201/141* (2013.01)

(58) Field of Classification Search
CPC .. G05D 1/0202; G08G 5/0034; G08G 5/0021; B64C 39/024
See application file for complete search history.

(56) References Cited

U.S. PATENT DOCUMENTS

| | | | | | |
|---|---|---|---|---|---|
| 5,597,136 | A | * | 1/1997 | Wilke | F41G 7/2246 244/3.15 |
| 6,718,236 | B1 | * | 4/2004 | Hammer | G08G 5/0008 342/36 |
| 6,972,696 | B2 | * | 12/2005 | Rogers | G01C 23/00 340/971 |
| 7,212,135 | B1 | * | 5/2007 | Lynch | G08G 5/0065 244/183 |
| 7,584,027 | B2 | | 9/2009 | Jaillant | |
| 7,642,953 | B2 | * | 1/2010 | Cheng | G01S 7/003 342/179 |
| 8,078,395 | B2 | * | 12/2011 | Builta | G05D 1/0202 244/1 R |
| 2007/0145183 | A1 | * | 6/2007 | Baudry | G01C 21/12 244/76 R |

(Continued)

*Primary Examiner* — Alex C Dunn
(74) *Attorney, Agent, or Firm* — GE Aviation Systems LLC; William Andes

(57) ABSTRACT

Systems and methods for determining a flight path of an aircraft are provided. In one embodiment, a method can include identifying one or more parameter(s) associated with a moving target. The method can include determining a moving circular flight path associated with the moving target based at least in part on the parameter(s) associated with the moving target. The method can include identifying one or more condition(s) associated with at least one of the aircraft and the moving circular flight path. The method can include determining a flight path of the aircraft from a location of the aircraft to the moving circular flight path based at least in part on the parameter(s) associated with the moving target and the condition(s) associated with at least one of the aircraft and the moving circular flight path.

19 Claims, 8 Drawing Sheets

(56) References Cited

U.S. PATENT DOCUMENTS

| | | | |
|---|---|---|---|
| 2007/0288156 A1* | 12/2007 | Neff | F41G 7/343 |
| | | | 701/533 |
| 2009/0138146 A1* | 5/2009 | Cochet | G05D 1/0202 |
| | | | 701/11 |
| 2017/0132942 A1* | 5/2017 | Mere | G08G 5/0047 |

* cited by examiner

FLIGHT PATH MANAGEMENT SYSTEM

FIELD OF THE INVENTION

The present subject matter relates generally to determining aircraft flight paths and more particularly to determining the flight path of an aircraft to a moving target.

BACKGROUND OF THE INVENTION

Aircraft operators often desire aircrafts to fly around an area of interest (e.g., a ship wreck, accident site) to perform a search and rescue mission and/or surveillance. The flight path around such an area of interest can include a closed-loop ground path with a radial distance from the area of interest. In this way, the aircraft can maintain a particular distance while performing its mission with respect to the area-of-interest. Additionally, in the event that the area of interest is hostile, the aircraft can fly at a safe distance from the area of interest.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of determining a flight path of an aircraft. The method can include identifying, by one or more computing devices associated with an aircraft, one or more parameters associated with a moving target. The method can further include determining, by the one or more computing devices, a moving circular flight path associated with the moving target such that the moving target is surrounded by the moving circular flight path based at least in part on the one or more parameters associated with the moving target. The method can include identifying, by the one or more computing devices, one or more conditions associated with at least one of the aircraft and the moving circular flight path. The method can further include determining, by the one or more computing devices, a flight path of the aircraft from a location of the aircraft to the moving circular flight path based at least in part on the one or more parameters associated with the moving target and the one or more conditions associated with at least one of the aircraft and the moving circular flight path.

Another example aspect of the present disclosure is directed to a computing system for determining a flight path of an aircraft. The system can include one or more processors included on an aircraft. The system can include one or more memory devices included on the aircraft. The one or more memory devices can store instructions that when executed by the one or more processors cause the one or more processors to identify a moving target. The processors can identify one or more parameters associated with the moving target. The one or more parameters can include an initial location of the moving target and a velocity of the moving target. The processors can determine a moving circular flight path associated with the moving target such that the moving target is located within the moving circular flight path based at least in part on the one or more parameters associated with the moving target. The processors can identify one or more conditions associated with at least one of the aircraft and the moving circular flight path. The processors can determine a flight path of the aircraft from a location of the aircraft to the moving circular flight path based at least in part on the one or more parameters associated with the moving target and the one or more conditions associated with at least one of the aircraft and the moving circular flight path.

Yet another example aspect of the present disclosure is directed to an aircraft. The aircraft can include a flight management system. The flight management system can be configured to identify one or more parameters associated with a moving target. The flight management system can be configured to determine a moving circular flight path associated with the moving target such that the moving target is within the moving circular flight path. The moving circular flight path associated with the target can move such that the target remains within the moving circular flight path. The flight management system can be configured to identify one or more conditions associated with at least one of the aircraft and the moving circular flight path. The flight management system can be configured to determine a flight path of the aircraft from a location of the aircraft to the moving circular flight path based at least in part on the one or more parameters associated with the moving target and the one or more conditions associated with at least one of the aircraft and the moving circular flight path. The flight management system can be configured to generate an output indicative of the flight path. The flight management system can be configured to provide for display the output indicative of the flight path of the aircraft. The aircraft can further include a control display system configured to display the output indicative of the flight path of the aircraft for display on a user interface of a display device.

Other example aspects of the present disclosure are directed to systems, methods, aircrafts, avionics systems, devices, user interfaces, non-transitory computer-readable media for determining a flight path of an aircraft.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
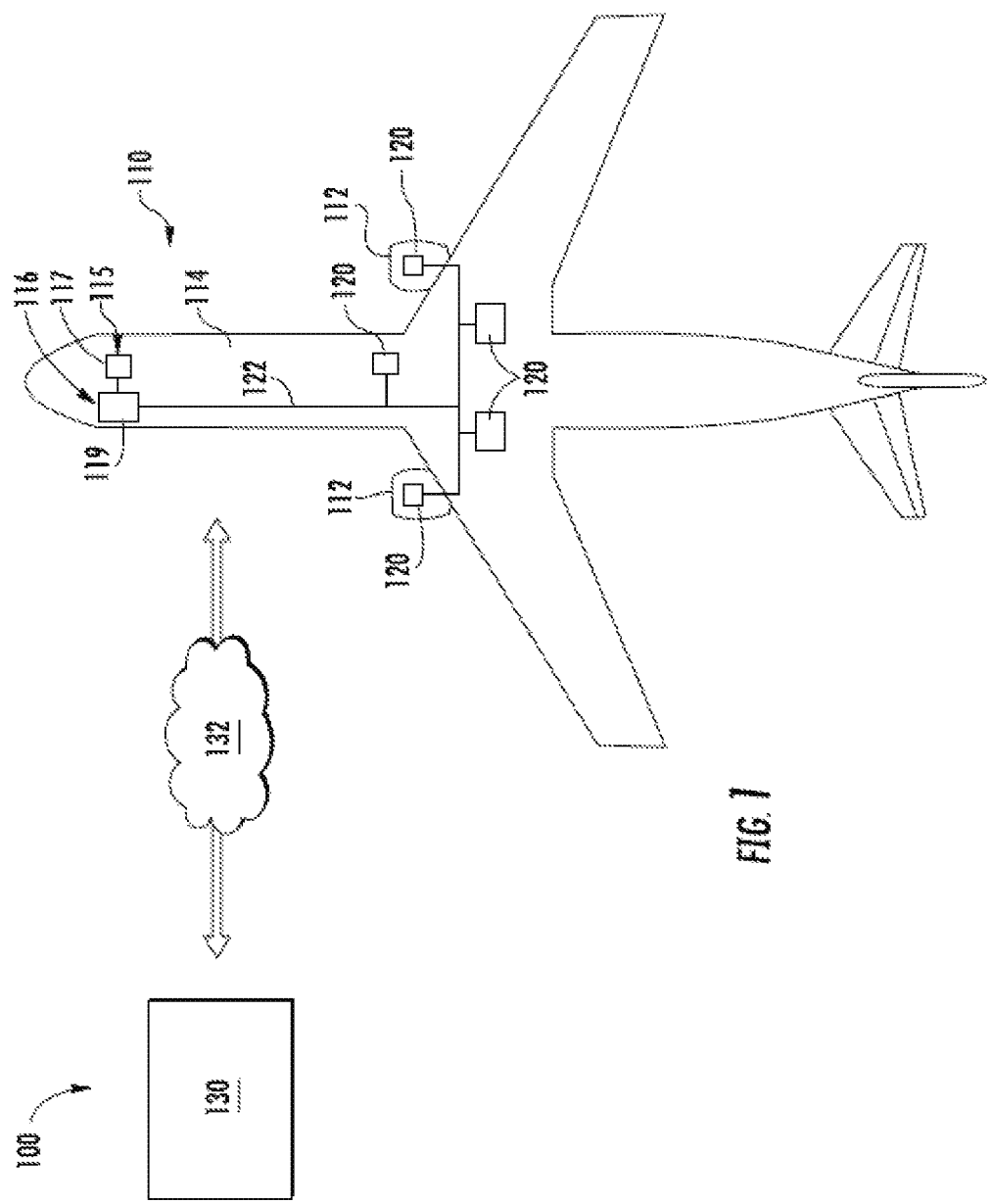
FIG. 1 depicts an example system according to example embodiments of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods of determining a flight path of an aircraft to a moving circular flight path around a moving target. For instance, a flight management system (FMS) of an aircraft can identify and/or be supplied with data identifying a moving target of interest (e.g., a ship, another aircraft). The moving target may be a target for which surveillance is desired, assistance is required, re-fuel needed, etc. The flight management system can determine one or more parameter(s) associated with the moving target (e.g., location, track, speed). The flight management system can then identify a moving circular flight path surrounding the target such that the target is located within (e.g., at the center of) the circular flight path. The circular flight path can move laterally (e.g., consistent with the track, speed, etc. of the target) such that the target remains within the circular flight path as the target moves. The flight management system can determine the optimum flight path from a location of the aircraft to the circumference of the moving circular flight path around the moving target. The optimum flight path can provide the minimum time for the aircraft to travel from its location to the circular flight path. Once at the circular flight path, the aircraft can fly in accordance with the circular flight path such that it travels around the target (e.g., for surveillance) at a radius. In this way, the present disclosure can provide an automated flight system with an efficient flight path for search and rescue of a moving target, aerial surveillance of moving vessels/vehicles of known position and velocity, unmanned (UAS/UAV) vehicle control, intercept and monitoring of moving extreme weather conditions, hostile targets, etc. with a safe stand-off distance.

More particularly, an aircraft can include a computing system and a display system. The computing system can be associated with, for example, a flight management system. The display system can be associated with, for example, a control display system. In some implementations, the flight management system can determine the optimum flight path for an aircraft from its location (e.g., current location, future location) to a moving circular flight path around a moving target. The moving target can include a vehicle, a ship, an aircraft, a unmanned aircraft, an individual, weather system, etc. that is moving.

The flight management system can be configured to identify one or more parameter(s) associated with a moving target. The one or more parameter(s) can include the initial location of the moving target, a track of the moving target (e.g., path target is travelling), a speed of the moving target, a velocity of the moving target, an altitude of the moving target, a target type, an entity associated with the target, and/or other parameters associated with the moving target. In some implementations, the flight management system can be configured to receive a set of data indicative of the one or more parameter(s) associated with the moving target from one or more remote computing device(s) (e.g., of a ground-based control center) that are not included on the aircraft.

The flight management system can be configured to determine a moving circular flight path associated with the moving target such that the moving target is within the moving circular flight path. The moving circular flight path can represent a circular (e.g., surveillance) route around the moving target (e.g., a ship). The moving circular flight path associated with the target can move such that the target remains at the center. For instance, in the event that the moving target is a ship, the moving circular flight path can move laterally according to a motion vector that is at least similar to the lateral motion of the ship. In some implementations, the flight management system can receive a set of data indicative of the moving circular flight path associated with the moving target from the remote computing device(s) (e.g., that are not included on the aircraft).

Moreover, the flight management system can be configured to identify one or more condition(s) associated with at least one of the aircraft and/or the moving circular flight path. For example, the flight management system can identify current atmospheric flight conditions in which the aircraft is or will be flying, aircraft performance information, the motion vector of the moving circular flight path, etc. The flight management system can identify such conditions via communication with various onboard systems (e.g., sensors, data acquisitions systems) and/or a remote computing system (e.g., operations center, weather center).

The flight management system can determine a flight path of the aircraft from a location of the aircraft to the moving circular flight path based, at least in part, on the parameter(s) associated with the moving target and the condition(s) associated with at least one of the aircraft and/or the moving circular flight path. The flight path can be an optimum lateral flight path to intercept a circumference of the moving circular flight path. For example, the flight path can be determined to decrease a travel time $(t_2-t_1)$ for the aircraft to travel from its location to the moving circular flight path. In some implementations, the flight path can represent a minimum lateral time flight path from the aircraft location to the circumference of the moving circular flight path, as further described below.

The flight management system can be configured to provide the determined flight path for display and acceptance. For instance, the flight management system can be configured to generate an output indicative of the flight path, and provide for display the output indicative of the flight path of the aircraft. The control display system can be configured to display the output indicative of the flight path of the aircraft for display on a user interface of a display device. A user (e.g., operator, flight crew member) can review and accept the flight path from the aircraft's location to the moving circular flight path. The flight management system can be notified of the acceptance of the flight path and implement the flight path such that the aircraft travels according to the flight path.

The systems and methods according to example aspects of the present disclosure provide an aircraft with an optimum lateral flight path to efficiently intercept a moving circular flight path around a moving target of interest. More particularly, the optimum flight path can increase fuel savings by flying according to precise distance, time, flight trajectory, and fuel burn predictions used for pre-planning missions. Furthermore, the systems and methods can reduce operator work load, allowing the operator to focus on real time conditions of a mission (e.g., for manned and unmanned aircrafts). In this way, the systems and methods according to example aspects of the present disclosure have a technical effect of providing fuel and time effective flight paths for missions, which can lead to a reduction in aircraft wear and mission unpredictably, further increasing safety.

FIG. 1 depicts an example system 100 according to example embodiments of the present disclosure. As shown, the system 100 can include an aircraft 110 having one or more engine(s) 112, a fuselage 114, a display system 115, and a computing system 116. The display system 115 can be, for instance, a control display system. The display system 115 can be associated with the computing system 116 and/or another system. The display system 115 can include one or more display device(s) 117 that are configured to display outputs indicative of a flight path on a user interface and/or receive user input associated with the outputs, as further described herein.

The computing system 116 can be, for instance, a flight management system. As shown in FIG. 1, the computing system 116 can include one or more computing device(s) 119 that can be associated with, for instance, an avionics system and/or the aircraft 110. The computing device(s) 119 can include various components for performing various operations and functions. For example, and as further described herein, the computing device(s) 119 can include one or more processor(s) and one or more memory device(s). The one or more memory device(s) can store instructions that when executed by the one or more processor(s) cause the one or more processor(s) to perform the operations and functions described herein. In some implementations, the one or more computing device(s) 119 can be included in the aircraft 110. In some implementations, the computing system 116 can be remote from the aircraft 110 but communicate with the aircraft 110 to implement a determined flight path.

The computing device(s) 119 can be configured to communicate with various other systems. For instance, the computing device(s) 119 can be coupled to a variety of onboard systems 120 of the aircraft 110 over a network 122. The onboard system(s) 120 can be associated with navigation systems (e.g., global positioning systems), aircraft control systems, aircraft maintenance systems, data acquisition systems, a flight recorder, monitoring systems, sensors, and/or other systems of the aircraft 110. The network 122 can include a data bus or combination of wired and/or wireless communication links.

Additionally, and/or alternatively, the computing device(s) 119 can be configured to communicate with one or more remote computing device(s) 130 that are not included on the aircraft 110. The remote computing device(s) 130 can be associated with an operations center, command center, mission control center, ground-based center, weather center, etc. The computing device(s) 119 can be configured to communicate with the remote computing device(s) 130 via one or more network(s) 132. The network(s) 132 can include at least one of a SATCOM network, VHF network, a HF network, a Wi-Fi network, a WiMAX network, a gatelink network, and/or any other suitable communications network for transmitting data to and/or from the aircraft 110. In some implementations, the computing device(s) 119 can communicate with the onboard system(s) 120 and/or the remote computing device(s) 130 to help determine parameters associated with a moving target and/or conditions associated with the aircraft 110 and/or moving circular flight paths around the moving targets.

In some implementations, the display system 115 can be remote from the aircraft 110. For example, the aircraft 110 can be associated with unmanned (UAS/UAV) vehicle control. The aircraft 110 can be controlled via communications with the one or more remote computing device(s) 130. The display system 115 can be associated with such remote computing device(s). The computing system 116 can be configured to communicate with the display system 115 (e.g., to perform some of the operations described herein) via the network 132.

Figure 2:
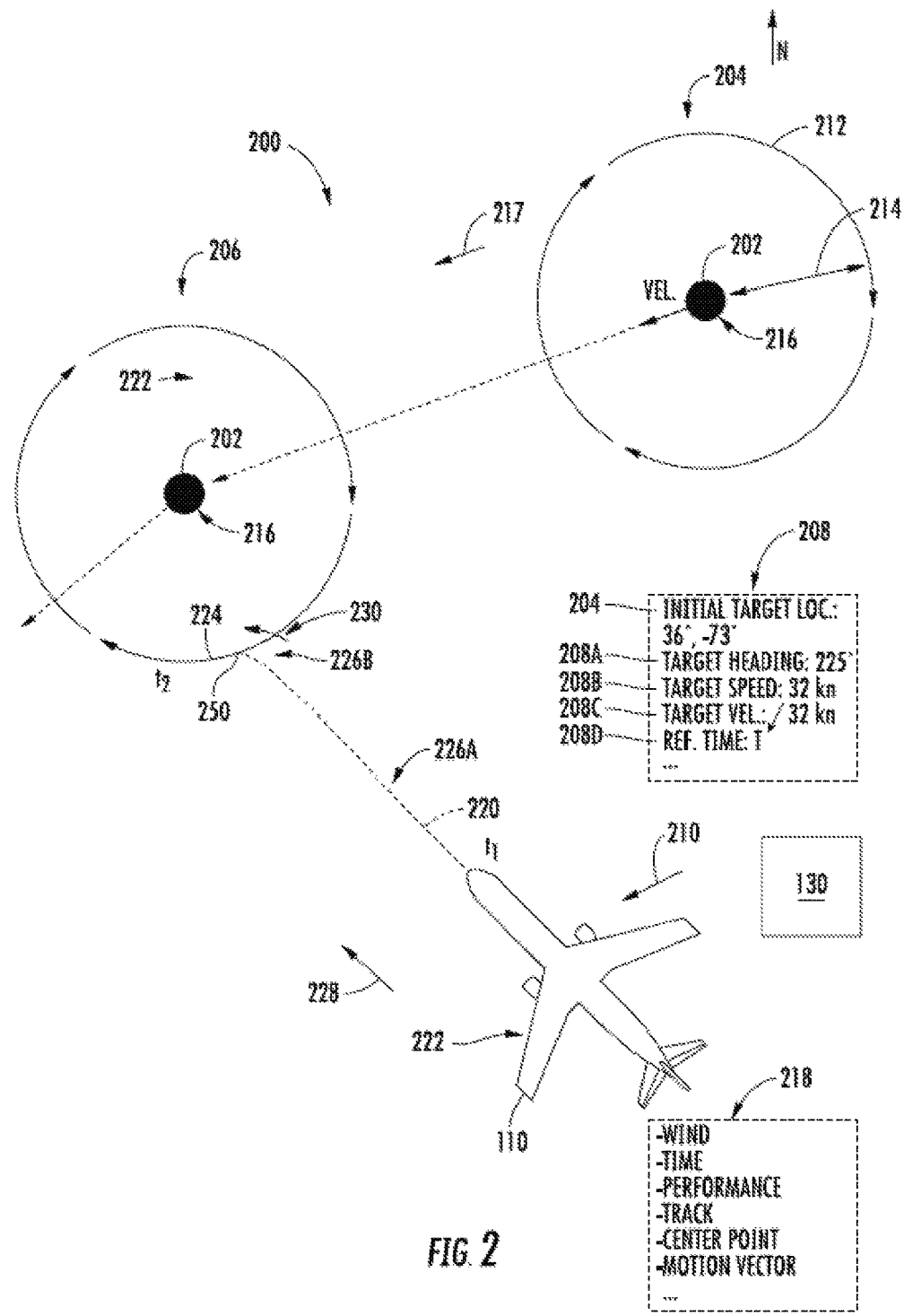
FIG. 2 depicts a schematic of example flight paths according to example embodiments of the present disclosure.

FIG. 2 depicts a schematic of example flight paths according to example embodiments of the present disclosure. The computing device(s) 119 can be configured to identify a moving target 202. The moving target 202 can include a vehicle, a ship, an aircraft, a unmanned aircraft, an individual, weather system, etc. that is moving. For instance, the moving target 202 can move from an initial location 204 (e.g., 36 degrees latitude, −73 degrees longitude) to a second location 206 (e.g., 35 degrees latitude, −74.5 degrees longitude). The moving target 202 can continue to move (e.g., beyond the second location). In some implementations, the computing device(s) 119 can be configured to identify the moving target 202 without communication with other systems. In some implementations, the computing device(s) 119 can be configured to identify the moving target 202 based, at least in part, on communications with the onboard system(s) 120 and/or the remote computing device(s) 130. For instance, the remote computing device(s) 130 can be associated with an operations entity, a command center, mission control center, ground based center, friendly aircraft, etc. The computing device(s) 119 can be configured to receive a set of data indicative of the moving target 202 from the remote computing device(s) 130.

The computing device(s) 119 can be configured to identify one or more parameter(s) 208 associated with the moving target 202. The one or more parameter(s) 208 can include the initial location 204 (e.g., latitude, longitude) of the moving target 202, a heading 208A of the moving target 202, a speed 208B of the moving target 202, a velocity 208C of the moving target 202, a reference time 208D associated with the moving target 202 (e.g., a time of observation, a time when target 202 is a the initial location), a track of the moving target 202, an altitude of the moving target 202, a target type, an entity associated with the target, and/or other parameters associated with the moving target 202. In some implementations, the computing device(s) 119 can be configured to identify the parameter(s) 208 without communication with other systems. In some implementations, the computing device(s) 119 can be configured to receive a set of data 210 indicative of the parameter(s) 208 associated with the moving target 202 from the remote computing device(s) 130.

The computing device(s) 119 can be configured to determining a moving circular flight path 212 associated with the moving target 202. The moving circular flight path 212 can be associated with a flight path by which the aircraft 110 can travel around the moving target 202 at a constant distance or radius 214 as the moving target 202 continues to move. The moving circular flight path 212 can surround the moving target 202. The moving target 202 be within the moving circular flight path 212. In some implementations, the radius 214 of the moving circular flight path 212 can be programmed to change such that the distance between the moving target 202 and the aircraft 110 (e.g., traveling in accordance with the moving circular flight path 212) can increase and/or decrease. In some implementations, the flight path for the aircraft 100 can be determined to accommodate for a change in the radius 214. The moving circular flight path 212 can be used, for instance, to conduct surveillance of the moving target 202. While FIG. 2 depicts the moving circular flight path 212 in a clockwise direction, this is not intended to be limiting as the moving circular flight path 212 could move in another direction (e.g., counter-clockwise).

The moving circular flight path 212 can surround the moving target 202. In some implementations, the moving target 202 be within the moving circular flight path 212. For example, the aircraft 110 can determine the moving circular flight path 212 associated with the moving target 202 such that the moving target 202 can be located within (e.g., at the center 216 of) the moving circular flight path 212 based, at least in part, on the one or more parameter(s) 208 associated with the moving target 202. As such, the moving circular flight path 212 can move according to a motion vector 217. The motion vector can be at least similar to and/or related to a motion vector associated with the moving target 202.

By way of example, the computing device(s) 119 can identify a ship as the moving target 202. The computing device(s) 119 can identify that the initial location 204 of the ship is 36 degrees latitude, −73 degrees longitude, that the initial heading 208A of the ship is 225 degrees, and that the speed 208B of the ship is 32 knots. The computing device(s) 119 can determine the moving circular flight path 212 based, at least in part, on these parameters such that the ship is located within the moving circular flight path 212, as the ship moves. The moving circular flight path 212 can move according to the motion vector 217, at a velocity that is consistent with the ship. Moreover, the computing device(s) 119 can determine the radius 214 of the moving circular flight path 212. This can be based, at least in part, on the type of moving target, weather conditions, additional aircraft in the area, aircraft performance and type, etc.

The computing device(s) 119 can be configured to identify one or more condition(s) 218 associated with at least one of the aircraft 110 and/or the moving circular flight path 212. The condition(s) 218 can include one or more initial condition(s) and/or one or more predicted condition(s). The initial condition(s) can include aircraft position, aircraft track, true airspeed, current wind vector, current time, aircraft performance, bank angle limitation, the center point (e.g., 216) of the moving circular flight path 212, a turn radius, the motion vector 217, the reference time 208D, etc. The reference time can also, and/or alternatively, be associated with a past and/or future time and/or can indicate a time at which the moving circular flight path 212 begins to move along the motion vector 217. The predicted condition(s) can include conditions that the aircraft predicts to occur at a future time, such as when the aircraft is traveling in accordance with the moving circular flight path 212. By way of example, the predicted condition(s) can include a planned speed change. The planned speed change can include an acceleration or deceleration that can be programmed to occur prior to joining the moving circular flight path 212. The effect of the speed change on the time-based solution can be predicted by the computing device(s) 119 and can be accounted for.

The computing device(s) 119 can be configured to determine a flight path 220 of the aircraft 110 from a location 222 of the aircraft 110 to the moving circular flight path 212 based, at least in part, on the one or more parameter(s) 208 associated with the moving target 202, and/or the one or more condition(s) 218 associated with at least one of the aircraft 110 and/or the moving circular flight path 212. The location 22 can be a current location and/or a future location. For example, the aircraft 110 can travel to address another mission, but can pre-plan to have the aircraft 110 travel on a flight path from some future location (e.g., associated with the other mission) to the moving circular flight path 212. The flight path 220 can be an optimum lateral flight path to intercept a circumference 224 of the moving circular flight path 212. The flight path 220 can be determined to decrease a travel time ($t_2-t_1$) for the aircraft 110 to travel from the location 222 to the moving circular flight path 212. In some implementations, the computing device(s) 119 can determine the flight path 220 such that it represents a minimum lateral time flight path from the aircraft location 222 to within proximity of the circumference 224 of the moving circular flight path 212, as further described below.

As shown in FIG. 2, in some implementations, the flight path 220 can include one or more segment(s) 226A-226B. For example, the flight path 220 can include a first segment 226A and/or a second segment 226B. The first segment 226A of the flight path 220 can be associated with a first path from the current location 222 to within proximity of a circumference 224 of the moving circular flight path 212. The first segment 226A can include a substantially straight segment from the aircraft 110, for instance, along the course to an area in the vicinity of an intercept point 250 with the moving circular flight path 212. Additionally, and/or alternatively, the firsts segment 226A can be associated with a geodesic, the shortest ground path distance, etc. The second segment 226B can be associated with a second path to orient the aircraft 110 to travel in accordance with the moving circular flight path 212. For example, the second segment 226B can include a curved path, such as, a transition turn 230 around the intercept point 250 that joins the moving circular flight path 212.

While FIG. 2 depicts the flight path 212 from a location outside a circumference 224 of the moving circular flight path 212, this is not intended to be limiting. In some implementations, the computing device(s) 119 can determine the flight path 212 from a location 222 inside the circumference 224 of the moving circular flight path 212 (e.g., inside the bounds of the path).

Figure 3:
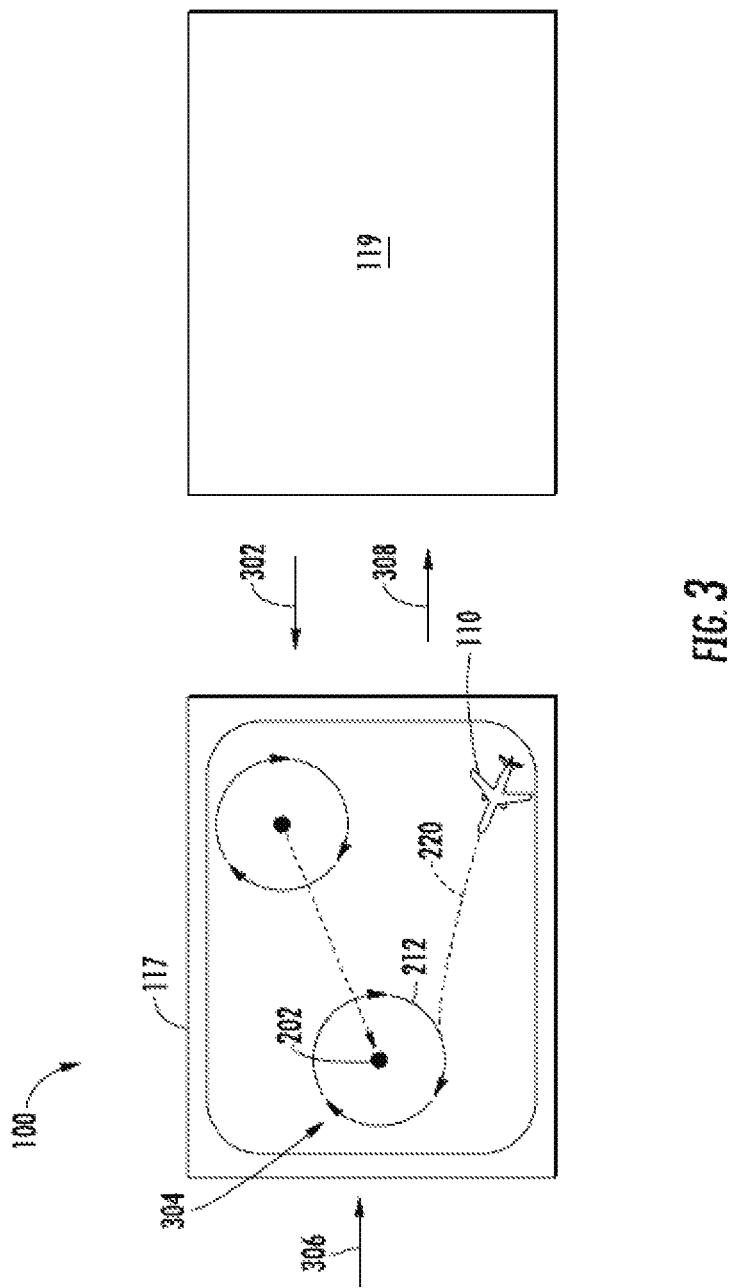
FIG. 3 depicts an example system according to example embodiments of the present disclosure.

The computing device(s) 119 can be configured to generate an output indicative of the flight path for display. For example, FIG. 3 depicts a portion of the example system 100 according to example embodiments of the present disclosure. As shown, the computing device(s) 119 can generate an output 302 indicative of the flight path 220 of the aircraft 110. Additionally, and/or alternatively, the output 302 can be indicative of the moving target 202, the moving circular pattern 212, the parameter(s) 208, the condition(s) 218, and/or other data. The computing device(s) 119 can be configured to provide for display the output 302 indicative of the flight path 220 of the aircraft 110 on a user interface 304 of a display device 117.

The display device 117 can receive the output 302 and display at least the flight path 220 of the aircraft 110 on the user interface 304. For example, the display device 117 (e.g., associated with the control display system 115) can display at least the flight path 220 of the aircraft 110 on the user interface 304 for a user associated with the aircraft 110 (e.g., a remote operator, a member of the flight crew). The user can interact with the display device 117 and/or another device via an input device (e.g., microphone, mouse, touch screen, track ball) to accept and/or reject the flight path 220. In the event that the flight path 220 is accepted, the display device 117 can receive a set of data 306 indicative of an acceptance of the flight path 220 (e.g., via the user input). The display device 117 can provide, and the computing device(s) 119 can receive, a set of data 308 indicative of an acceptance of the flight path 220 via the user interface 304.

Figure 4:
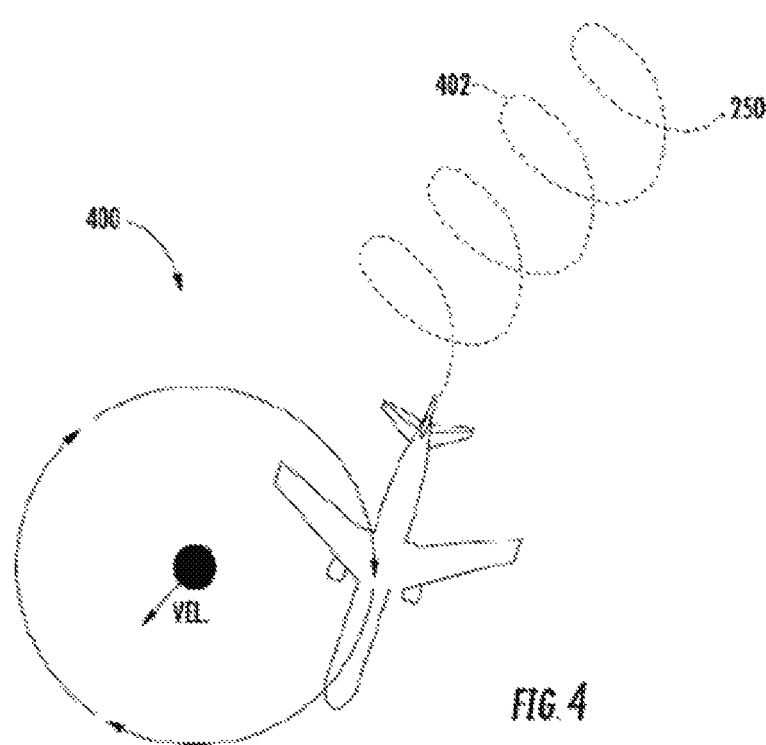
FIG. 4 depicts a schematic of an example flight path according to example embodiments of the present disclosure.

The computing device(s) 119 can be configured to implement the flight path 220 such that the aircraft 110 is to travel according to the flight path 220. For instance, the computing device(s) 119 can be configured to implement the flight path 220 via the flight management system and/or the auto-pilot system of the aircraft 110. Upon implementation, the aircraft 110 can travel according to the first segment 226A of the flight path 220 to within proximity of the circumference 224 of the moving circular flight path 212 and according to the second segment 226B to transition into flight along the moving circular flight path 212. In some implementations, at the end of the curved path transition turn 230, the lateral steering control can switch from traditional straight and curve segment steering to specific steering techniques to acquire and track the moving circular flight path 212. As the aircraft 110 travels according to the moving circular flight path 212, the aircraft 110 will move circularly and laterally in a manner similar to the example flight pattern 402 of the schematic 400 shown in FIG. 4.

Figure 5:
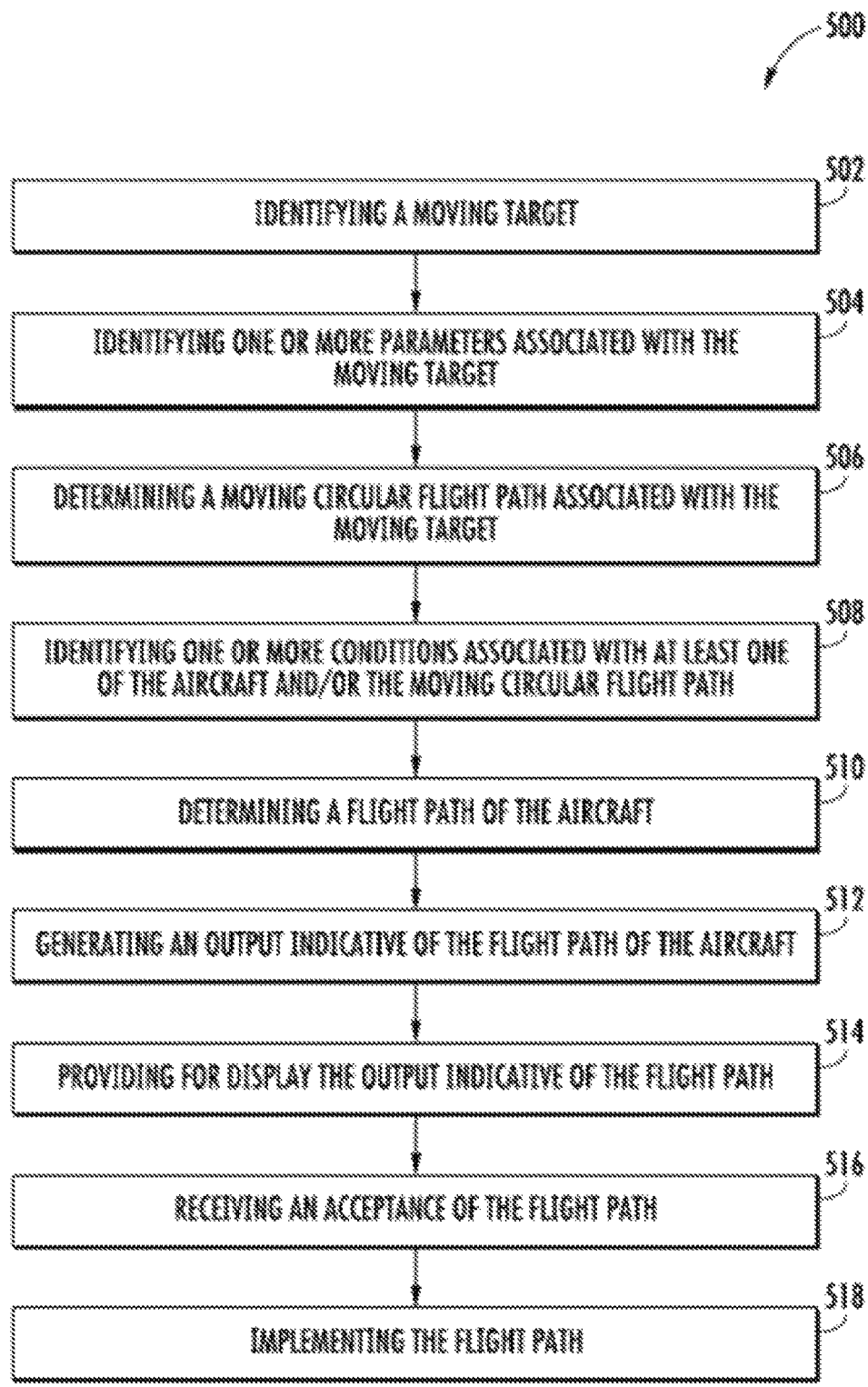
FIGS. 5-7 depicts flow diagrams of example methods for determining a flight path of an aircraft according to example embodiments of the present disclosure.

FIG. 5 depicts a flow diagram of example method 500 of determining a flight path of an aircraft according to example embodiments of the present disclosure. FIG. 5 can be implemented by one or more computing device(s), such as the computing device(s) 119 depicted in FIGS. 1 and 8. One or more step(s) of the method 500 can be performed while aircraft 110 is in-flight. In addition, FIG. 5 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (502), the method can include identifying a moving target. For instance, the computing device(s) 119 can identify the moving target 202. As described herein, the computing device(s) 119 can identify the moving target 202 via one or more communication(s) with the remote computing device(s) 130 (e.g., a mission control center, command center, ground-based system). Additionally, and/or alternatively, the computing device(s) 119 can identify the moving target 130 without communicating with other systems.

At (504), the method can include identifying one or more parameter(s) associated with the moving target. For instance, the computing device(s) 119 included on the aircraft 110 can identify one or more parameter(s) 208 associated with the moving target 202. As described herein, the one or more parameter(s) 208 can include an initial location 204 of the moving target 202, a heading 208A of the moving target 202, a speed 208B of the moving target 202, and a reference time 208D associated with the moving target 202. The computing device(s) 119 can identify the one or more parameter(s) 208 by communicating with one or more remote computing device(s) 130. For example, the computing device(s) 119 can receive a set of data 210 indicative of the one or more parameter(s) 208 associated with the moving target 202 from one or more remote computing device(s) 130 that are not included on the aircraft 110.

At (506), the method can include determining a moving circular flight path associated with the moving target. For instance, the computing device(s) 119 can determine a moving circular flight path 212 associated with the moving target 202 such that the moving target 202 is surrounded by the moving circular flight path 212 based, at least in part, on the one or more parameter(s) 208 associated with the moving target 202. The moving circular flight path 212 associated with the moving target 202 can move laterally such that the moving target 202 remains within (e.g., at the center of) the moving circular flight path 212. For example, the computing device(s) 119 can determine the moving circular flight path 212 based, at least in part, on the initial location 204 (e.g., 36 degrees latitude, −73 degrees longitude) of the moving target 202, a heading 208A (e.g., 270 degrees) of the moving target 202, and a speed 208B (e.g., 32 knots) of the moving target 202 (e.g., a ship) and/or a reference time 208D. The moving circular flight path 212 can be determined such that a radius of the moving circular flight path 212 is associated with a safe stand-off distance for the aircraft 110 while traveling in accordance with the moving circular flight path 212. In some implementations, the computing device(s) 119 can determine the moving circular flight path 212 by receiving a set of data indicative of the moving circular flight path 212 from one or more remote computing device(s) 130.

At (508), the method can include identifying one or more condition(s) associated with at least one of the aircraft and/or the moving circular flight path. The computing device(s) 119 can identify one or more condition(s) 218 associated with at least one of the aircraft 110 and/or the moving circular flight path 212. In some implementations, the condition(s) 218 can include initial conditions and/or predicted conditions. For example, the computing device(s) 119 can identify current atmospheric flight conditions in which the aircraft 110 is or will be flying, aircraft performance information, the motion vector 217 of the moving circular flight path 212, etc.

At (510), the method can include determining a flight path of the aircraft. The computing device(s) 119 can determine a flight path 212 of the aircraft 110 from a location 222 of the aircraft 110 to the moving circular flight path 212 based, at least in part, on the one or more parameter(s) 208 associated with the moving target 202 and/or the one or more condition(s) 218 associated with at least one of the aircraft 110 and/or the moving circular flight path 212. For example, the flight path 220 of the aircraft 110 can be determined to decrease a travel time (e.g. $t_2-t_1$) for the aircraft 110 to travel from the location 222 (e.g., current, future) to the moving circular flight path 212. The flight path 220 can be associated with an optimum lateral flight path from the location 222 to the moving circular flight path 212 that is associated with the minimum time necessary for the aircraft 110 to reach (and/or join) the moving circular flight path 212 from the aircraft's location 222.

By way of example, the computing device(s) 119 can use the curvature of the earth along with the condition(s) 218 (e.g., initial conditions, predicted conditions) to solve for an estimated minimum time at which the aircraft 110 will join the moving circular flight path 212. The estimated minimum time can be used to find an intercept point 250, which can be the point at which the flight path 220 to join the moving circular flight path 212 intersects the circumference 224 of the moving circular flight path 212. The estimated minimum time and the intercept point 250 can be refined to account for wind effect on the ground speed of the aircraft 110, the time to fly the turn 230 to join the moving circular flight path 212, a planned speed change, and/or other factors. Additionally, and/or alternatively, a wind vector and a predicted aircraft track along a potential flight path can be used to predict the aircraft ground speed at several points in time (e.g., seconds, milliseconds, etc.).

The flight path 220 (e.g., an optimum flight path) can then be constructed. For example, the flight path 220 can include a first segment 226A and a second segment 226B. The first segment 226A of the flight path 220 can be associated with a first path from the current location 222 to within proximity of a circumference of the moving circular flight path 212.

The second segment 226B can be associated with a second path to orient the aircraft 110 to travel in accordance with the moving circular flight path 212. The first segment 226A can include a straight (and/or substantially straight) path, for example, from the aircraft 110 along the course to the intercept point 250. The second segment 226B can include a curved path, for example, including a transition turn 230 around the intercept point 250 that joins the moving circular flight path 212. The curved path can join the moving circular flight path 212 at an angle that accounts for the drift angle effect of the moving circular flight path motion and/or the aircraft ground speed at time of intercept. As described above, at the end of the curved path transition turn, the lateral steering control of the aircraft 110 can switch from traditional straight and curve segment steering to steering techniques to navigate the moving circular flight path 212.

The computing device(s) 119 can be configured to determine the flight path 220 based, at least in part, on updated parameter(s) 208 and/or condition(s) 218. For example, one or more of the parameter(s) 208 (e.g., target speed 208B) and/or conditions 218 (e.g., wind effect) can change with time. The computing device(s) 119 can receive one or more update(s) to at least one of the one or more parameter(s) 208 and/or condition(s) 218. In some implementations, the computing device(s) 119 can receive the updates periodically (e.g., every 5, 10, 15, 30, 60 s), upon-request, continuously, etc. The computing device(s) 119 can determine the flight path 220 of the aircraft 110 based, at least in part, on at least one of the updated parameter(s) and/or updated condition(s). In this way, the computing device(s) 119 can take into account the changing parameters and/or conditions when determining the optimum flight path.

Figure 6:
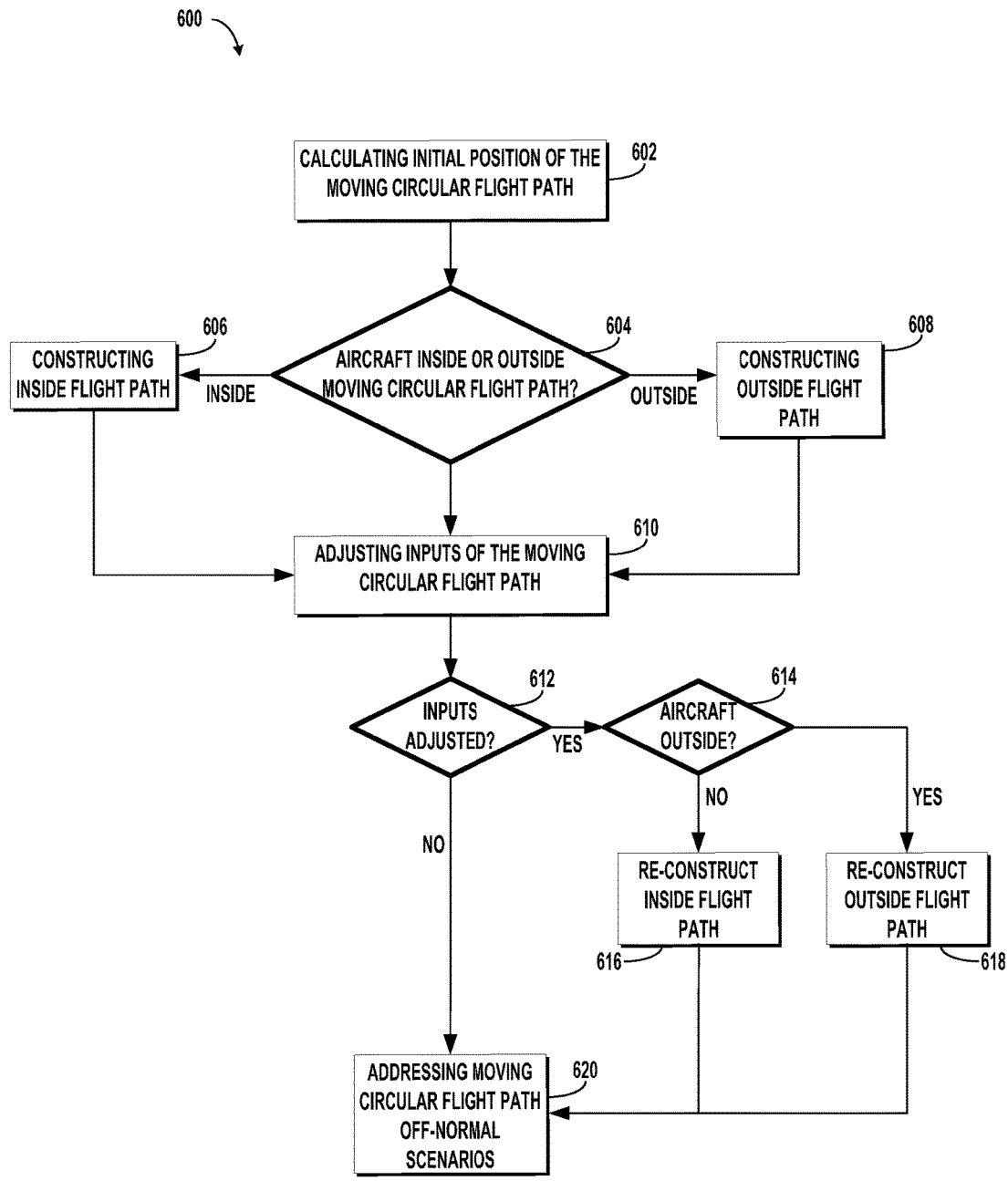

FIG. 6 depicts an example method 600 for determining a flight path according to example embodiments of the present disclosure. In some implementations, the method 600 can be implemented at (510) of method 500. FIG. 6 can be implemented by one or more computing device(s), such as the computing device(s) 119 depicted in FIGS. 1 and 8. One or more step(s) of the method 600 can be performed while aircraft 110 is in-flight. In addition, FIG. 6 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (602), the method 600 can include calculating the initial position of the moving circular flight path. For instance, the computing device(s) 119 can calculate the initial position of the moving circular flight path 212. In some implementations, the initial position of the moving circular flight path 212 can be associated with the initial location 204 (e.g., 36 degrees latitude, −73 degrees longitude) of the moving target 202. As indicated above, a reference time (e.g., 208D) associated with the moving circular flight path 212 can indicate the time at which the motion of the moving circular flight path 212 begins (e.g., a time at which the moving circular flight path 212 begins to move along the motion vector 217).

At (604), the method 600 can include determining whether the aircraft is inside or outside the moving circular flight path. For instance, the computing device(s) 119 can determine whether the aircraft 110 is inside or outside the moving circular flight path 212, while it is at the location 222 and/or another location at which the aircraft 110 will be positioned. In the event that it is determined that the aircraft 110 is inside the moving circular flight path 212, the computing device(s) 119 can construct a flight path 220 (e.g., an optimum inside lateral flight path) to the moving circular flight path 212 from a location inside the moving circular flight path 212, at (606). In the event that it is determined that the aircraft 110 is outside the moving circular flight path 212, the computing device(s) 119 can construct a flight path 220 (e.g., an optimum outside lateral flight path) to the moving circular flight path 212 from a location outside the moving circular flight path 212, at (608).

Figure 7:
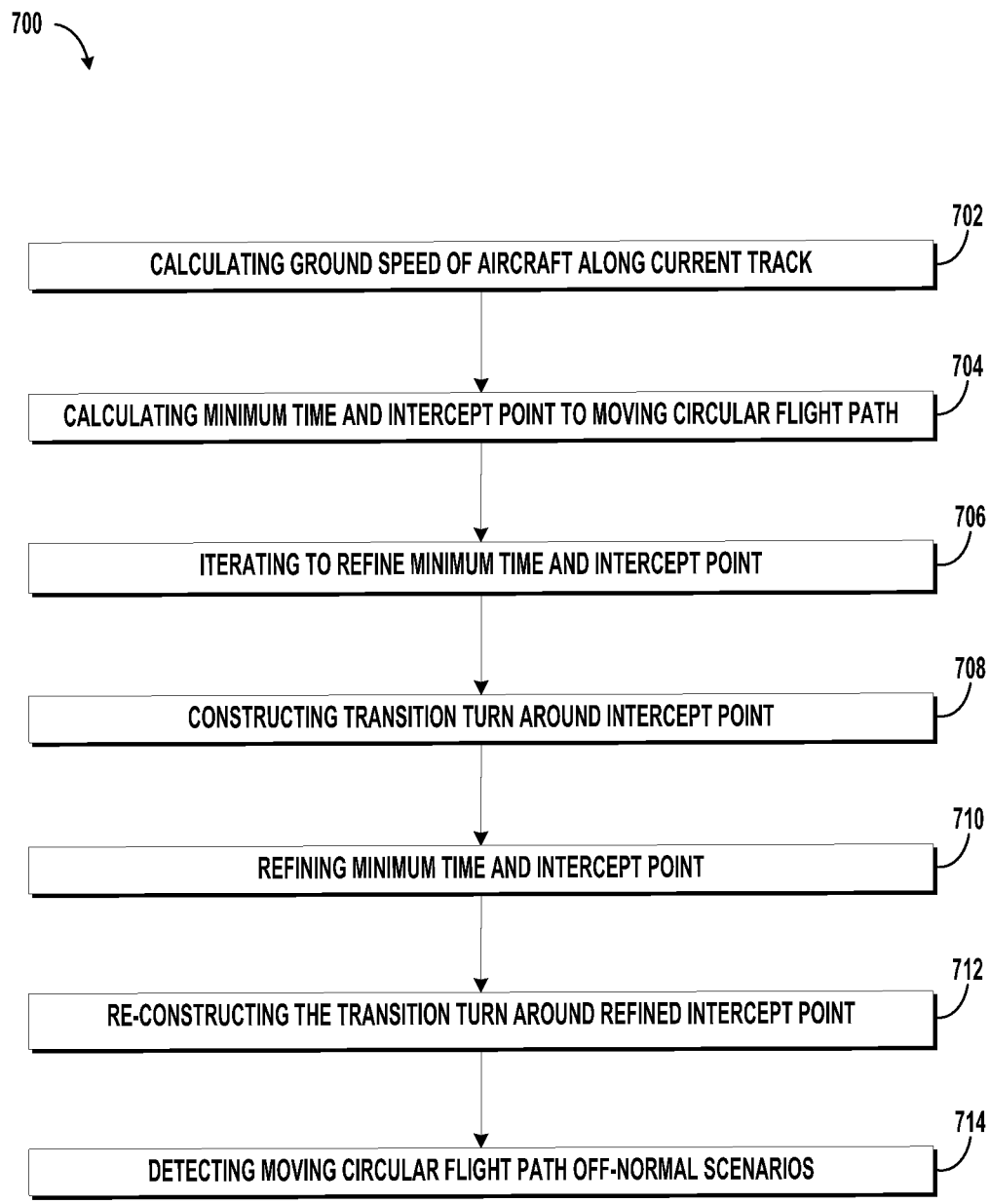

FIG. 7 depicts an example method 700 for constructing a flight path of the aircraft according to example embodiments of the present disclosure. In some implementations, the method 700 can be implemented at (606), (608), (616), and/or (618) of method 600. FIG. 7 can be implemented by one or more computing device(s), such as the computing device(s) 119 depicted in FIGS. 1 and 8. One or more step(s) of the method 700 can be performed while aircraft 110 is in-flight. In addition, FIG. 7 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (702), the method 700 can include calculating the groundspeed of the aircraft along a current track. For instance, the computing device(s) 119 can calculate a groundspeed of the aircraft 110 along a current track of the aircraft 110. In doing so, the groundspeed calculation can be based, at least in part, on one or more of the conditions 218 such as, for example, the wind vector experienced by the aircraft 110. At (704), the computing device(s) 119 can also calculate the estimated minimum time for the aircraft 110 to reach the circumference 224 of the moving circular flight path 212 and/OR the intercept point 250 (e.g., a point at which the aircraft's flight path will intercept the moving circular flight path 212). This can be based, at least in part, on whether the aircraft 110 is inside or outside the moving circular flight path 212. At (706), the computing device(s) 119 can iterate the calculations at (702) and/or (704) to refine the minimum time and the intercept point 250 and, for example, to account for the predicted aircraft track and groundspeed along the flight path 220 to the intercept point 250. This can allow the computing device(s) 119 to account for potential changes associated with the aircraft 110 (and its conditions) along the flight path 220.

At (708), the method 700 can include constructing a transition turn around the intercept point. For instance, the computing device(s) 119 can determine the transition turn 230 around the intercept point 250 (e.g., that joins the moving circular flight path 212) based, at least in part, on the drift angle effect of the moving circular flight path 212 motion and the predicted aircraft groundspeed at the time of intercept. At (710), the computing device(s) 119 can refine the minimum time and intercept point 250 based, at least in part, on the time to fly the transition turn 230, the wind effects associated with the transition turn 230, planned speed changes associated with flying the transition turn 230, and/or other factors. The computing device(s) 119 can re-construct the transition turn 230 around the refined intercept point 250, at (712). This can allow for a more accurate determination of the transition turn 230 that the aircraft 110 will need to fly to appropriately join the moving circular flight path 212.

At (714), the method 700 can include detecting moving circular flight path off-normal scenarios. For instance, the computing device(s) 119 can determine off-normal scenarios associated with the moving circular flight path 212. By way of example, the computing device(s) 119 can determine whether the moving target 202 is moving at a speed faster than the aircraft 110, making it difficult for the aircraft 110 to reach the moving circular flight path 212.

Returning to FIG. 6, at (610), the method 600 can include adjusting the inputs of the moving circular flight path 212. For instance, the computing device(s) 119 can adjust any parameters associated with the moving circular flight path 212 used to construct the flight path 220, as needed, to account for the effect of the time at which the motion of the moving circular flight path 212 begins (e.g., reference time 208D). At (612)-(618), in the event that the inputs are adjusted, the computing device(s) 119 can re-construct the flight path 220 based, at least in part, on whether the aircraft 110 is inside or outside the moving circular flight path 220. At (620), the computing device(s) 119 can address the off-normal scenarios associated with the moving circular flight path 212. For instance, the computing device(s) 119 can adjust the track and/or speed of the aircraft 110 such that the aircraft 110 is able to reach the moving circular flight path 212, in the event the moving target 202 is moving at a speed faster than the aircraft 110.

Returning to FIG. 5, at (512), the method can include generating an output indicative of the flight path of the aircraft. For instance, the computing device(s) 119 can generate an output 302 indicative of the flight path 220 of the aircraft 110. At (514), the method can include providing for display the output indicative of the flight path. For instance, the computing device(s) 119 can provide for display the output 302 indicative of the flight path 220 of the aircraft 110 on a user interface 304 of a display device 117. As described herein, the display device 117 can be included on the aircraft 110 and/or be located remotely from the aircraft 110. In some implementations, a user can interact with the user interface 304 to accept the flight path 220 determined by the computing device(s) 119.

In some implementations, at (516), the method can include receiving an acceptance of the flight path. The computing device(s) 119 can receive a set of data 308 indicative of an acceptance of the flight path 220. This can occur, for example, in the event that a user (e.g., flight crew member, remote operator) associated with the display device 117 accepts the flight path 220.

At (518), the method can include implementing the flight path. For instance, the computing device(s) 119 can implement the flight path 220 such that the aircraft 110 is to travel according to the flight path 220. The aircraft 212 can travel according to the first segment 226A to arrive to the moving circular path 212 and according to the second segment 226B to join the moving circular flight path 212. In this way, the aircraft 110 can travel to and in accordance with the moving circular flight path 212 in an efficient and time effective manner.

Figure 8:
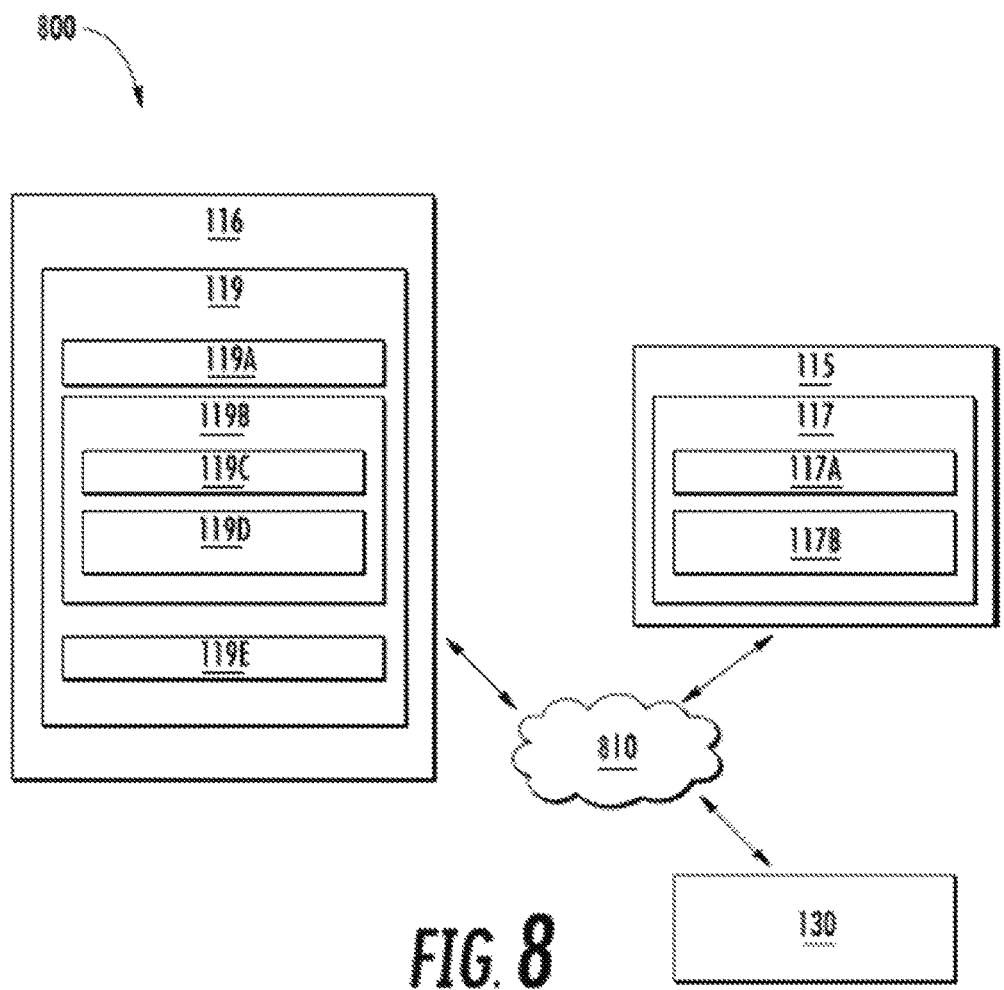
FIG. 8 depicts an example system according to example embodiments of the present disclosure.

FIG. 8 depicts an example system 800 according to example embodiments of the present disclosure. The system 800 can include the display system 115 and the computing system 116. In some implementations, the system 800 can include the remote computing device(s) 130. The display system 115, the computing system 116, and/or the remote computing device(s) 130 can be configured to communicate via network 810, which can correspond to any of the communication networks described herein (e.g., 122, 132).

The computing system 116 can include one or more computing device(s) 119. The computing device(s) 119 can include one or more processor(s) 119A and one or more memory device(s) 119B. The one or more processor(s) 119A can include any suitable processing device, such as a microprocessor, microcontroller, integrated circuit, logic device, and/or other suitable processing device. The one or more memory device(s) 119B can include one or more computer-readable media, including, but not limited to, non-transitory computer-readable media, RAM, ROM, hard drives, flash drives, and/or other memory devices.

The one or more memory device(s) 119B can store information accessible by the one or more processor(s) 119A, including computer-readable instructions 119C that can be executed by the one or more processor(s) 119A. The instructions 119C can be any set of instructions that when executed by the one or more processor(s) 119A, cause the one or more processor(s) 119A to perform operations. In some embodiments, the instructions 119C can be executed by the one or more processor(s) 119A to cause the one or more processor(s) 119A to perform operations, such as any of the operations and functions for which the computing system 116 and/or the computing device(s) 119 are configured, the operations for determining a flight path of an aircraft (e.g., method 500), as described herein, and/or any other operations or functions of the one or more computing device(s) 119. The instructions 119C can be software written in any suitable programming language or can be implemented in hardware. Additionally, and/or alternatively, the instructions 119C can be executed in logically and/or virtually separate threads on processor(s) 119A. The memory device(s) 119B can further store data 119D that can be accessed by the processor(s) 119A. For example, the data 119D can include data associated with moving target 202, the parameter(s) 208, the condition(s) 218, the moving circular flight path 212, the flight path 220, the output 302, an acceptance of a flight path (e.g., 308), and/or any other data and/or information described herein.

The computing device(s) 119 can also include a network interface 119E used to communicate, for example, with the other components of system 600 (e.g., via network 810). The network interface 119E can include any suitable components for interfacing with one or more network(s), including for example, transmitters, receivers, ports, controllers, antennas, and/or other suitable components.

The display system 115 can include one or more display device(s) 117. The display device(s) 117 can include an output device 117A such as a display screen, a speaker, etc. The display device(s) 115 can be associated with an input device 117B, such as a keyboard, a mouse, a microphone, a trackball, a touch screen, etc. The input device 117B can be configured to be utilized by a user to review, accept, decline, etc. the flight path 220.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A computer-implemented method of determining a flight path of an aircraft, the method comprising:
   identifying, by one or more computing devices associated with an aircraft, parameters associated with a moving target, the parameters including an initial location of the moving target, a track of the moving target, a speed of the moving target, and a reference time associated with the moving target;
   determining, by the one or more computing devices, a moving circular flight path associated with the moving target such that the moving target is surrounded by the moving circular flight path based at least in part on the parameters associated with the moving target;
   identifying, by the one or more computing devices, one or more conditions associated with at least one of the aircraft and the moving circular flight path, wherein the one or more conditions include predicted conditions, the predicted conditions including a planned speed change; and
   determining, by the one or more computing devices, a flight path of the aircraft from a location of the aircraft to the moving circular flight path based at least in part on the parameters associated with the moving target and the one or more conditions associated with at least one of the aircraft and the moving circular flight path, wherein the flight path of the aircraft is determined as a minimum lateral time flight path associated with a minimum time for the aircraft to reach the moving circular path from the location of the aircraft.

2. The computer-implemented method of claim 1, wherein the flight path comprises a first segment and a second segment, wherein the first segment of the flight path is associated with a first path from the location of the aircraft to within proximity of a circumference of the moving circular flight path, and wherein the second segment is associated with a second path to orient the aircraft to travel in accordance with the moving circular flight path, wherein the second segment comprises a transition turn around an intercept point that joining the moving circular flight path.

3. The computer-implemented method of claim 2, wherein the first segment includes a substantially straight path.

4. The computer-implemented method of claim 1, wherein the flight path of the aircraft is determined to decrease a travel time for the aircraft to travel from the current location of the aircraft to the moving circular flight path.

5. The computer-implemented method of claim 1, wherein the moving circular flight path associated with the moving target moves laterally such that the moving target remains within the moving circular flight path.

6. The computer-implemented method of claim 1, further comprising:
   generating, by the one or more computing devices, an output indicative of the flight path of the aircraft; and
   providing for display, by the one or more computing devices, the output indicative of the flight path of the aircraft on a user interface of a display device.

7. The computer-implemented method of claim 1, further comprising:
   receiving, by the one or more computing devices, a set of data indicative of an acceptance of the flight path.

8. The computer-implemented method of claim 1, further comprising:
   implementing, by the one or more computing devices, the flight path such that the aircraft is to travel according to the flight path.

9. The computer-implemented method of claim 1, wherein determining the flight path of the aircraft from the location of the aircraft to the moving circular flight path comprises:
   receiving, by the one or more computing devices, an update to at least one of the parameters and the one or more conditions; and
   determining, by the one or more computing devices, the flight path of the aircraft based at least in part on at least one of the updated parameters and the updated conditions.

10. A computing system for determining a flight path of an aircraft, the system comprising:
    one or more processors included on an aircraft; and
    one or more memory devices included on the aircraft, the one or more memory devices storing instructions that when executed by the one or more processors cause the one or more processors to:
    identify a moving target;
    identify parameters associated with the moving target, wherein the parameters comprise an initial location of the moving target and a velocity of the moving target;
    determine a moving circular flight path associated with the moving target such that the moving target is within the moving circular flight path based at least in part on the one or more parameters associated with the moving target;
    identify one or more conditions associated with at least one of the aircraft and the moving circular flight path, wherein the one or more conditions include predicted conditions, the predicted conditions including a planned speed change; and
    determine a flight path of the aircraft from a location of the aircraft to the moving circular flight path based at least in part on the parameters associated with the moving target and the one or more conditions associated with at least one of the aircraft and the moving circular flight path, wherein the flight path of the aircraft is determined as a minimum lateral time flight path associated with a minimum time for the aircraft to reach the moving circular path from the location of the aircraft.

11. The system of claim 10, wherein the flight path of the aircraft is determined to decrease a travel time for the aircraft to travel from the location to the moving circular flight path.

12. The system of claim 10, wherein the one or more processors are further to:

generate an output indicative of the flight path of the aircraft; and provide for display the output indicative of the flight path of the aircraft on a user interface of a display device.

13. The system of claim 12, wherein the one or more processors are further to:

receive a set of data indicative of an acceptance of the flight path via the user interface; and implement the flight path such that the aircraft is to travel according to the flight path.

14. The system of claim 10, wherein the flight path comprises a first segment and a second segment, wherein the first segment of the flight path is associated with a first path from the location to a circumference of the moving circular flight path, and wherein the second segment is associated with a second path to orient the aircraft to travel in accordance with the moving circular flight path.

15. An aircraft, comprising:

a flight management system configured to identify one or more parameters associated with a moving target, including an initial location of the moving target, a track of the moving target, and a speed of the moving target, and a reference time associated with the moving target, determine a moving circular flight path associated with the moving target such that the moving target is located within the moving circular flight path, wherein the moving circular flight path associated with the target moves such that the target remains within the moving circular flight path, identify one or more conditions associated with at least one of the aircraft and the moving circular flight path, wherein the one or more conditions include predicted conditions, the predicted conditions including a planned speed change, determine a flight path of the aircraft from a location of the aircraft to the moving circular flight path based at least in part on the parameters associated with the moving target and the one or more conditions associated with at least one of the aircraft and the moving circular flight path, wherein the flight path of the aircraft is determined as a minimum lateral time flight path associated with a minimum time for the aircraft to reach the moving circular path from the location of the aircraft, generate an output indicative of the flight path, and provide for display the output indicative of the flight path of the aircraft; and a control display system configured to display the output indicative of the flight path of the aircraft for display on a user interface of a display device.

16. The aircraft of claim 15, wherein the location of the aircraft is a future location of the aircraft.

17. The aircraft of claim 15, wherein to identify the parameters associated with the moving target, the flight management system is further configured to receive a set of data indicative of the parameters associated with the moving target from one or more remote computing devices that are not included on the aircraft.

18. The aircraft of claim 15, wherein to determine the moving circular flight path associated with the moving target, the flight management system is further configured to receive a set of data indicative of the moving circular flight path associated with the moving target from one or more remote computing devices that are not included on the aircraft.

19. The aircraft of claim 15, wherein the flight path of the aircraft is determined to decrease a travel time for the aircraft to travel from the location to the moving circular flight path.

* * * * *